(12) United States Patent
Akhavan et al.

(10) Patent No.: US 8,942,278 B2
(45) Date of Patent: Jan. 27, 2015

(54) SYSTEMS AND METHODS FOR DETECTING DATA COLLISIONS FOR A NEAR FIELD COMMUNICATION SYSTEM

(71) Applicant: QUALCOMM Incorporated, San Diego, CA (US)

(72) Inventors: Koorosh Akhavan, San Diego, CA (US); RaviKiran Gopalan, San Diego, CA (US); Eunmo Kang, San Diego, CA (US); Le Nguyen Luong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 13/791,737

(22) Filed: Mar. 8, 2013

(65) Prior Publication Data

US 2014/0086292 A1     Mar. 27, 2014

Related U.S. Application Data

(60) Provisional application No. 61/705,942, filed on Sep. 26, 2012.

(51) Int. Cl.
| | | |
|---|---|---|
| *H04B 3/46* | (2006.01) | |
| *H04B 17/00* | (2006.01) | |
| *H04B 5/00* | (2006.01) | |
| *H04Q 1/20* | (2006.01) | |

(52) U.S. Cl.
CPC ........................................ *H04B 5/00* (2013.01)

USPC ........... 375/224; 375/316; 375/324; 375/340; 340/10.1; 455/550.1

(58) Field of Classification Search
USPC ......... 375/224, 324, 340, 316, 24; 455/550.1; 340/10.1
See application file for complete search history.

(56) References Cited

U.S. PATENT DOCUMENTS

| | | | |
|---|---|---|---|
| 7,941,176 B2 | 5/2011 | Breitfuss et al. | |
| 2006/0239334 A1* | 10/2006 | Kwon et al. | 375/132 |
| 2008/0231424 A1 | 9/2008 | Arnitz | |
| 2011/0140855 A1 | 6/2011 | Funamoto et al. | |
| 2012/0275546 A1* | 11/2012 | Divsalar | 375/324 |
| 2013/0202062 A1* | 8/2013 | Sadr et al. | 375/324 |

OTHER PUBLICATIONS

Jin C., et al., "An Efficient Collision Detection Scheme for Generation-2 RFID Systems," IJCSI International Journal of Computer Science Issues, vol. 9 (5-1), Sep. 2012, pp. 29-39.

* cited by examiner

*Primary Examiner* — Ted Wang
(74) *Attorney, Agent, or Firm* — Kevin T. Cheatham (57) ABSTRACT

In a wireless near field communication (NFC) system, a target, such as a smart card, can communicate with an initiator, such as a card reader, by load modulating a radio frequency (RF) signal generated by the initiator. When two or more targets load modulate the RF signal generated, "collisions" can occur with the load modulation. Apparatus and methods detect the presence or absence of collisions in a lower layer or physical layer and report the presence of detected collisions to an upper layer for further handling.

28 Claims, 9 Drawing Sheets

FIG. 9

SYSTEMS AND METHODS FOR DETECTING DATA COLLISIONS FOR A NEAR FIELD COMMUNICATION SYSTEM

CROSS-REFERENCE TO RELATED APPLICATION

This application claims the benefit under 35 U.S.C. §119 (e) of U.S. Provisional Application No. 61/705,942, filed Sep. 26, 2012, the entirety of which is hereby incorporated by reference.

FIELD

The invention generally relates to electronics. In particular, the invention relates to wireless near field communication (NFC).

BACKGROUND

The wireless communication environment in a home or in an office typically includes a number of independently developed radio access technologies and standards. One of the communication standards currently being implemented in electronic equipment is near field communication (NFC). The use of NFC interfaces in electronic equipment provides portable devices with functions similar to those of non-contact integrated circuit cards (e.g., RFID cards).

Electronic equipment provided with NFC interfaces are typically capable of operating as radio frequency (RF) readers and/or writers to communicate with other NFC devices. A basic aspect of NFC is an usage of electromagnetic waves in a RF range and that a transmission of information contents is realized over a short distance only, for instance in a range of several centimeters.

RFID applications are widely used in many areas such as public traffic service, object tracking systems and home management. In an NFC or an RFID application, a transmitter of a proximity coupling device (PCD), also known as a reader, writer, or initiator, may use one of following three linear codes, followed by an amplitude modulation: (1) a Modified-Miller code used for type A NFC, (2) a non-return-to-zero (NRZ) code used in type B NFC, and (3) a Manchester code used in type F NFC.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when peer devices communicate in a wireless communication system.

One embodiment includes an apparatus, wherein the apparatus includes: a circuit configured to generate a first soft symbol and a second soft symbol, wherein values of the first soft symbol and the second soft symbol are at least indicative of a presence or absence of load modulation in a first portion and a second portion of a data symbol period of a near field communication signal; and a collision analyzer configured to determine whether or not a collision is present based at least partly on comparisons of the values of the first soft symbol and the second soft symbol with at least two different threshold levels.

One embodiment includes an electronically-implemented method of detecting data collisions for a near field communication system, wherein the method includes: generating a first soft symbol and a second soft symbol, wherein values of the first soft symbol and the second soft symbol are at least indicative of a presence or absence of load modulation in a first portion and a second portion of a data symbol period of a near field communication signal; and determining whether or not a collision is present based at least partly on comparisons of the values of the first soft symbol and the second soft symbol with at least two different threshold levels.

One embodiment includes an apparatus for detecting data collisions for a near field communication system, wherein the apparatus includes: a means for generating a first soft symbol and a second soft symbol, wherein values of the first soft symbol and the second soft symbol are at least indicative of a presence or absence of load modulation in a first portion and a second portion of a data symbol period of a near field communication signal; and a means for determining whether or not a collision is present based at least partly on comparisons of the values of the first soft symbol and the second soft symbol with at least two different threshold levels.

One embodiment includes an apparatus for detecting data collisions induced for a near field communication system, wherein the apparatus includes: a processor; and a computer program executable by the processor the computer program embodied in a tangible, non-transitory computer-readable medium, wherein the computer program embodies a method comprising: generating a first soft symbol and a second soft symbol, wherein values of the first soft symbol and the second soft symbol are at least indicative of a presence or absence of load modulation in a first portion and a second portion of a data symbol period of a near field communication signal; and determining whether or not a collision is present based at least partly on comparisons of the values of the first soft symbol and the second soft symbol with at least two different threshold levels.

Details of one or more implementations of the subject matter described in this specification are set forth in the accompanying drawings and the description below. Other features, aspects, and advantages become apparent from the description, the drawings, and the claims.

BRIEF DESCRIPTION OF THE DRAWINGS

These drawings (not to scale) and the associated description herein are provided to illustrate specific implementations of the invention and are not intended to be limiting.

In this description, reference is made to the drawings in which like reference numerals may indicate identical or functionally similar elements.

DETAILED DESCRIPTION OF CERTAIN IMPLEMENTATIONS

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In a wireless near field communication (NFC) system, a target, such as a smart card, can communicate with an initiator, such as a card reader, by load modulating a radio frequency (RF) signal generated by the initiator. When two or more targets load modulate the RF signal generated, "collisions" can occur with the load modulation. For example, with only one smart card, there will be times when the smart card is loading the RF signal, and times when the card is not loading the RF signal. When there are two or more smart cards present, there can be times when one smart card is loading the RF signal when the other smart card is not loading the RF signal, vice-versa, and times when both smart cards are loading the RF signal. Various implementations examine the RF signal for modulation characteristics that should not occur when only one smart card is present. For example, in a first half of a symbol period and in a second half of a symbol period, valid states correspond to modulated in the first half and not modulated in the second half, modulated in the second half and not modulated in the first half, and not modulated in either first half or second half. Various implementations examine the RF signal for signatures other than these and can declare the presence of a collision when, for example, modulation in both the first half and the second half are detected.

Figure 1:
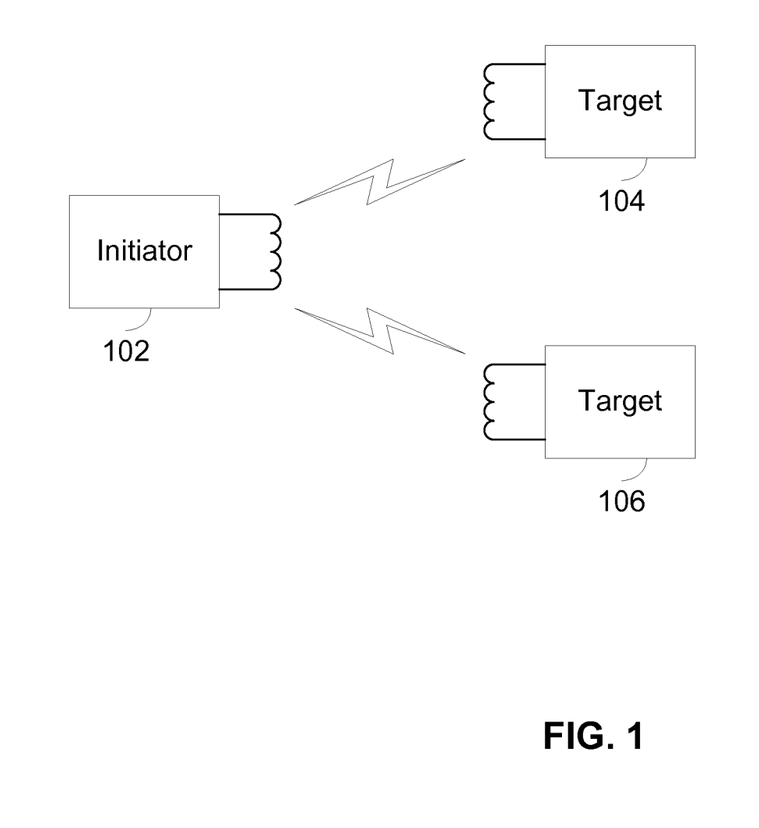
FIG. 1 illustrates an example of an initiator and targets for near field communication.

Under normal circumstances, an initiator 102, e.g., a card reader, communicates with only one target, e.g., a smart card, tag, etc., at a time. The communication is via magnetic coupling with coils at a relatively low radio frequency, such as 13.56 Megahertz. The initiator 102 generates the RF signal, which is then modulated by a target via load modulation, which in turn is sensed by the initiator 102.

FIG. 1 illustrates an environment in which problems can arise. When the initiator 102 simultaneously communicates with two or more targets 104, 106, the load modulation from the two or more targets 104, 106 can interfere with each other, undesirably resulting in "collision."

One implementation of the invention operates in a lower layer or physical layer to detect collisions in real time and report the presence of detected collisions to an upper layer for further handling. The layers referred to herein can correspond to abstraction layers of an open systems interconnection (OSI) model. For example, the upper layer can be implemented by firmware, and the presence of detected collisions can be reported by setting an interrupt, which then invokes a particular subroutine for handling of the collisions. The disclosed techniques are not applicable to mental steps, and are not performed within the human mind or by a human writing on a piece of paper.

While illustrated in the context of an NFC type A receiver with a 106 kbps data rate of operation, the principles and advantages may be applicable to other NFC types and/or rates.

To transmit either a "1" or a "0," a target will load modulate the RF signal. For example, in connection with an NFC-A, 106 kbps mode, a "1" can be encoded by load modulating the first half of a symbol period and not load modulating the second half of the symbol period. Without collisions, a symbol period should have a load modulated half and an unmodulated half regardless of whether a "1" or a "0" is being sent. However, with collisions, there is the additional load modulation being performed by at least one additional target. Thus, both halves of a symbol period can exhibit load modulation when two opposite bits are being transmitted at the same time, which may be detected by a receiver as a collision.

Figure 2:
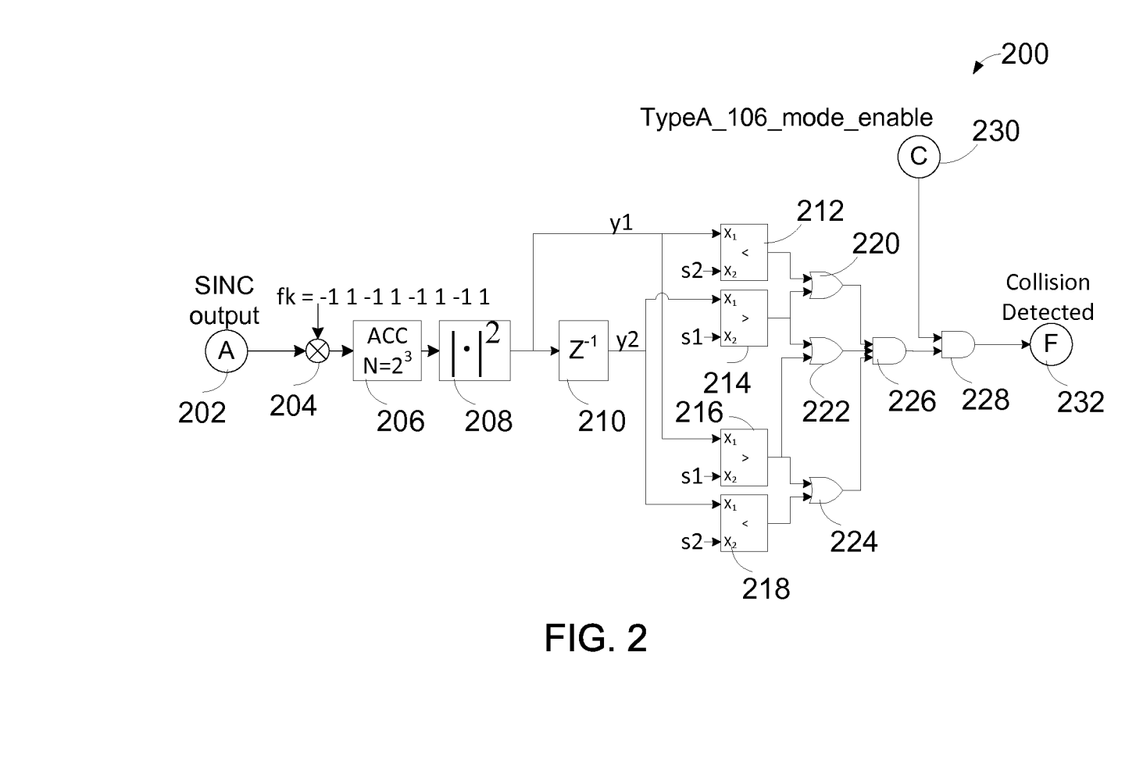
FIG. 2 illustrates a block diagram of a collision detector.

FIG. 2 illustrates a block diagram of a collision detector 200 according to one implementation of the invention. The collision detector 200 can be embodied in a receiver of the initiator 102. After some signal processing, an example of which will be described in greater detail later in connection with FIG. 8, a baseband signal "A" 202 is generated from the RF signal and is provided as an input to the collision detector 200. The baseband signal "A" 202 can be a digital signal with multiple samples per symbol period, such as 16 samples, and with each sample 16 bits of resolution. However, other bits of resolution can be used. The collision detector 200 does not detect data, but rather, detects the presence of data collisions.

In the illustrated implementation, the collision detector 200 includes a multiplier 204, an accumulator 206, a magnitude squarer 208, a delay element 210 first to fourth digital comparators 212-218, first to third OR gates 220-224, a first AND gate 226, and a second AND gate 228.

The baseband signal "A" 202 and a replica code fk are provided as inputs to the multiplier 204. In the illustrated implementation, there are two code chips of the replica code fk for each data symbol period.

An output of the multiplier 204 is provided as an input to the accumulator 206. The multiplier 204 and the accumulator 206 form a code-matched filter and generate a demodulated output, such that the output of the accumulator 206 can correspond to the original data before modulation by the code. However, it should be noted that when there is more than one target 104, 106 communicating with the initiator 102, the demodulated output can correspond to a combination of the data modulated by the one or more targets 104, 106. In the illustrated implementation of FIG. 2, the accumulator 206 accumulates for half of a data symbol period at a time.

After each half data symbol period, an output of the accumulator 206 is provided as an input to the magnitude squarer 208. What is desired to be sensed is the presence of load modulation by the two or more targets 104, 106 and not necessarily the detection of the data modulating the load modulation. The combination of the multiplier 204, the accumulator 206, and the magnitude squarer 208 provide an output that provides an indication of whether load modulation is present during a half data symbol period. The output of the magnitude squarer 208 does not correspond to demodulated data.

Rather than provide a decoded state of the data transmitted, the output of the magnitude squarer 208 detects the presence of the energy of the load modulation, which occurs regardless of whether the data is transmitted as a "1" or "0." In the illustrated implementation, the magnitude squarer 208 generates two soft symbols y1, y2, with one for each half of a data symbol period. As used herein, a soft symbol is represented by multiple bits of resolution. Each of the soft symbols y1, y2 have multiple bits of resolution, such as, but not limited to, 16 bits. It can be useful for precision in the multiplier 204, the accumulator 206, and the magnitude squarer 208 to carry the full precision, but the full precision is not necessarily needed for the threshold tests.

Figure 3A:
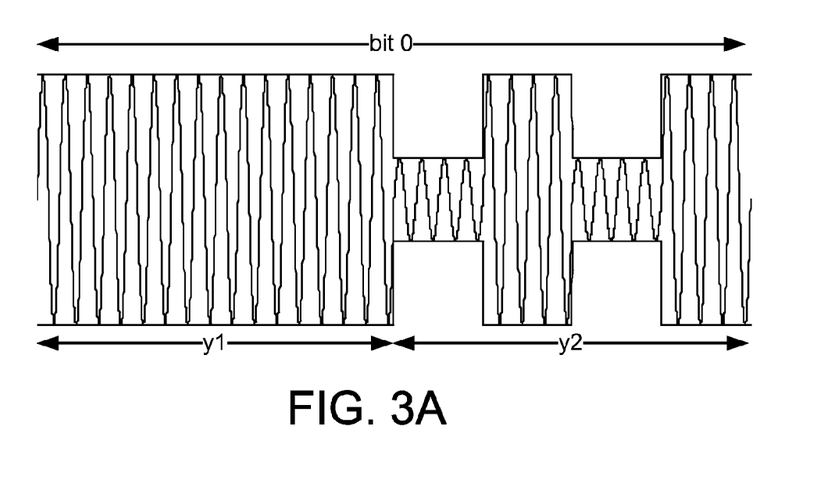
FIG. 3A illustrates an example of load modulation for bit 0.

FIG. 3A illustrates an example of load modulation for bit 0 for an NFC type A receiver with a 106 kbps data rate of operation. The relative frequencies of the RF signal and the load modulation carried by the RF signal are for illustrative purposes and are not to scale. The symbol period has a first half period or first portion associated with a first soft symbol y1 and a second half period or portion associated with a second soft symbol y2. The first portion and the second portion do not have to be precisely a first half and a second half, respectively. To transmit a "0," a target will load modulate the RF signal such that the first half of the symbol period is not load modulated and the second half of the symbol period is load modulated as shown in FIG. 3A.

Figure 3B:
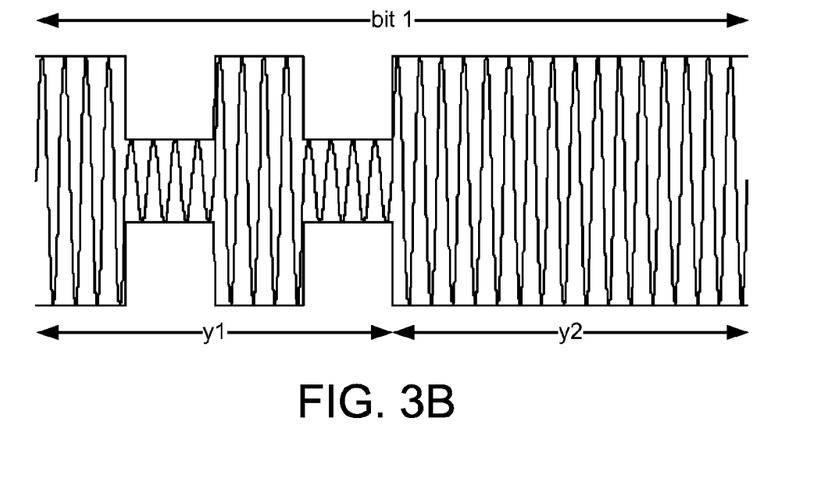
FIG. 3B illustrates an example of load modulation for bit 1.

FIG. 3B illustrates an example of load modulation for bit 1 for an NFC type A receiver with a 106 kbps data rate of operation. The symbol period has a first half period associated with a first soft symbol y1 and a second half period associated with a second soft symbol y2. To transmit a "1," a target will load modulate the RF signal such that the first half of the symbol period is load modulated and the second half of the symbol period is not load modulated as shown in FIG. 3B. However, with collisions, an additional load modulation is performed by at least one additional target. Thus, both halves of a symbol period can exhibit load modulation, which is detected as a collision.

Figure 4:
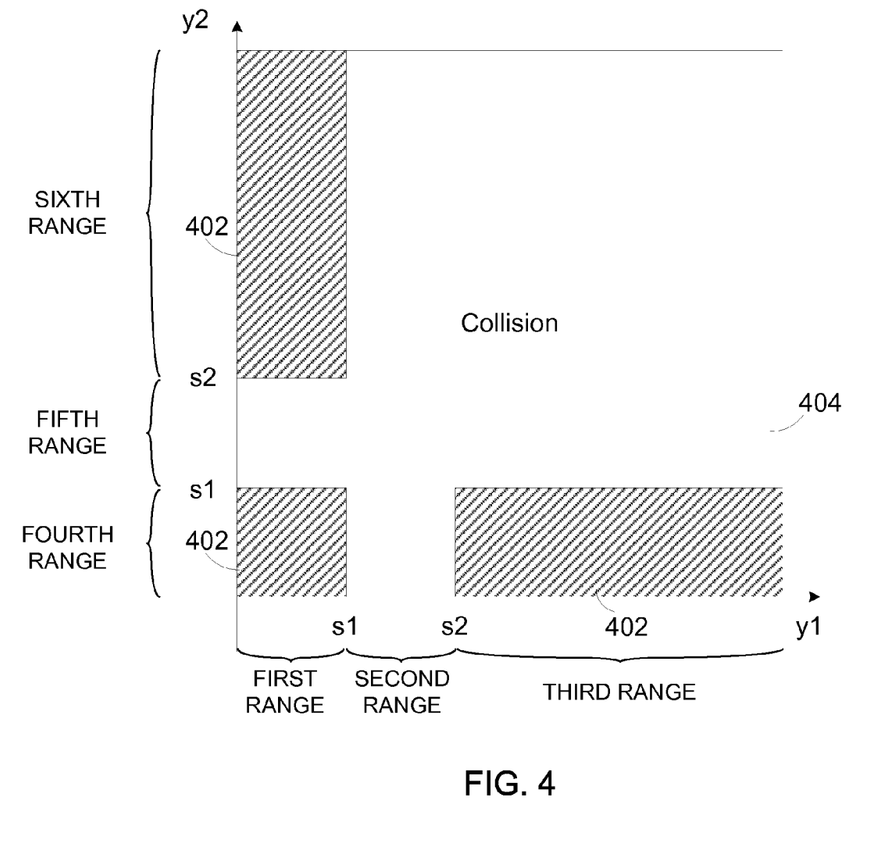
FIG. 4 illustrates a 2-dimensional map of possible ranges for soft symbols y1, y2.

FIG. 4 illustrates a 2-dimensional map of possible ranges for the two soft symbols y1, y2. Values for the soft symbol y1 are expressed along a horizontal axis, with values increasing from left to right. Values for the soft symbol y2 are expressed along a vertical axis, with values increasing from low to high. Threshold levels s1, s2 are also illustrated within the map. An implementation that uses at least two different threshold levels s1, s2 advantageously detects more collisions and/or falsely detects fewer collisions than a configuration in which only one threshold level is used. These additional areas of collision detection are illustrated by the second range and the fifth range in FIG. 4. In one implementation, the threshold levels s1, s2 are programmable. For example, programmable registers can be provided to permit a processor of the initiator 102 executing firmware instructions to program the threshold levels s1, s2. In the illustrated implementation, the threshold levels s1, s2 used for y1 are the same as the threshold levels s1, s2 used for y2, but can be different levels in an alternative implementation.

The threshold level s1 is set such that when a soft symbol y1 or y2 is at a level below the threshold level s1, no load modulation is determined for that particular half cycle. The threshold level s2 is set such that when a soft symbol y1 or y2 is at a level above the threshold level s2, load modulation is determined to have occurred.

Accordingly, when the soft symbols y1, y2 map to one of the shaded regions 402, the collision detector 200 determines that there is no collision. When the soft symbols y1, y2 map to the unshaded region 404, the collision detector 200 determines that there is a collision.

The digital comparators 212-218, OR gates 220-224, and first AND gate 226 implement the logic expressed in FIG. 4. Of course, other logical circuits can apply, such as the De Morgan's equivalent. While described in the context of digital hardware, such as implemented in an application specific integrated circuit (ASIC), field programmable gate array (FPGA), discrete logic gates or the like, the logic can also be implemented by a processor executing software or firmware instructions that are stored on a tangible non-transient computer-readable medium. For example, the tangible non-transient computer-readable medium can include one or more of Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

A first digital comparator 212 compares the soft symbol y1 to the threshold level s2 and generates a "1" as an output when the value of the soft symbol y1 is less than the threshold level s2. Otherwise, the first digital comparator 212 generates a "0."

A second digital comparator 214 compares the soft symbol y2 to the threshold level s1 and generates a "1" as an output when the value of the soft symbol y2 is greater than the value of the threshold level s1. Otherwise, the second digital comparator 214 generates a "0."

A third digital comparator 216 compares the soft symbol y1 to the threshold level s1 and generates a "1" as an output when the value of the soft symbol y1 is greater than the value of the threshold level s1. Otherwise, the third digital comparator 216 generates a "0."

A fourth digital comparator 218 compares the soft symbol y2 to the threshold level s2 and generates a "1" as an output when the value of the soft symbol y2 is less than the value of the threshold level s2. Otherwise, the fourth digital comparator 218 generates a "0."

Figure 5:
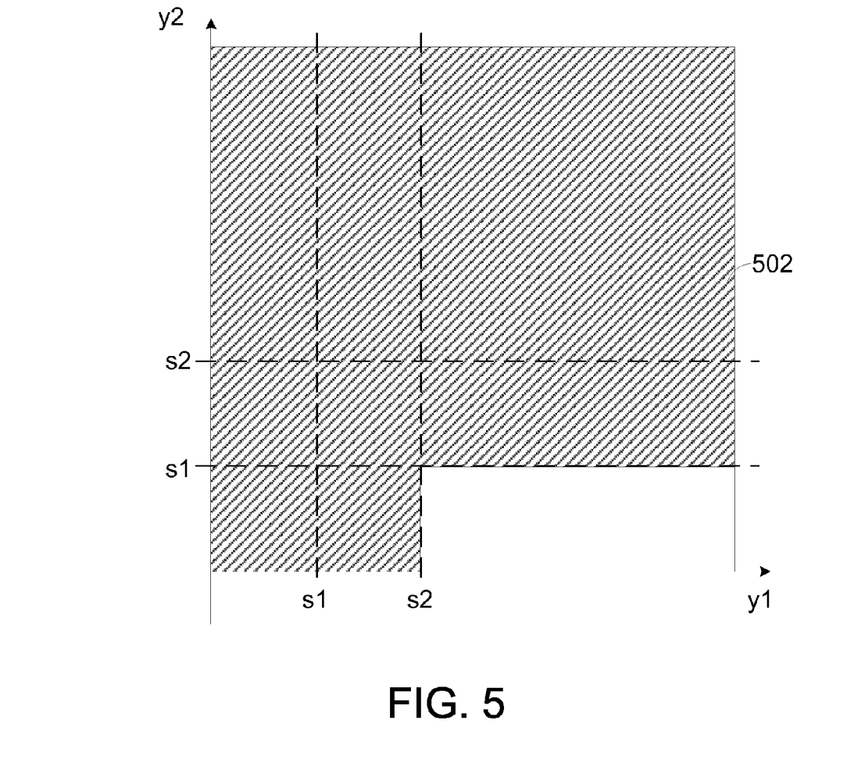
FIGS. 5, 6, and 7 illustrate examples of regions used for collision detection in connection with the collision detector of FIG. 2.

A first OR gate 220 receives as inputs, the outputs of the first digital comparator 212 and the second digital comparator 214. A shaded region 502 in the map of FIG. 5 corresponds to the region of values of the soft symbols y1, y2 for which the first OR gate 220 goes high or generates a "1" as an output.

Figure 6:
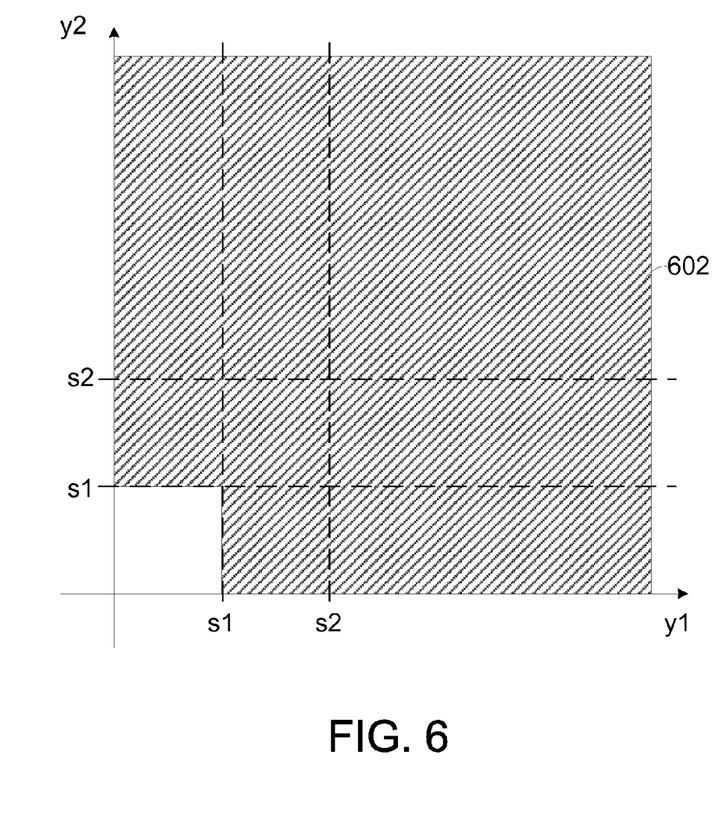

A second OR gate 222 receives as inputs, the outputs of the second digital comparator 214 and the third digital comparator 216. A shaded region 602 in the map of FIG. 6 corresponds to the region of values of the soft symbols y1, y2 for which the second OR gate 222 generates a "1" as an output.

Figure 7:
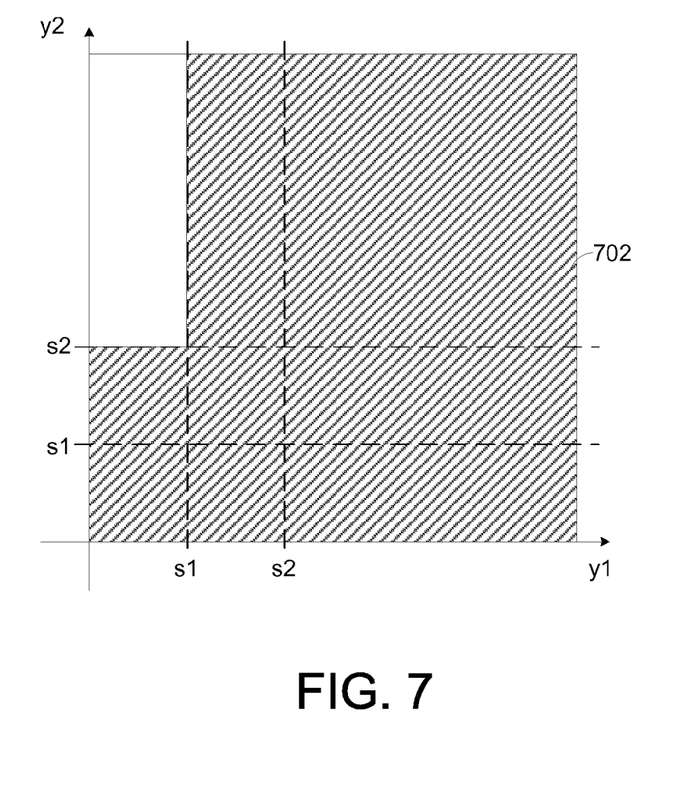

A third OR gate 224 receives as inputs, the outputs of the third digital comparator 216 and the fourth digital comparator 218. A shaded region 702 in the map of FIG. 7 corresponds to the region of values of the soft symbols y1, y2 for which the third OR gate 224 generates a "1" as an output.

The outputs of the first OR gate 220, the second OR gate 222, and the third OR gate 224 are ANDed together by the first AND gate 226. The output of the first AND gate 226 goes high or generates a "1" when the values for the soft symbols y1, y2 are in the unshaded region 404 of the map of FIG. 4. The output of the first AND gate 226 can be used as the output of the collision detector 200.

Optionally, the second AND gate 228 having the output of the first AND gate 226 as an input and having a TypeA_106_mode_enable control signal as another input can be used to implement a way to enable/disable the output of the collision detector 200. Of course, the AND gates 226, 228 can also be combined into a single AND gate.

FIG. 4 further illustrates a first range, a second range, and a third range along the horizontal axis for values of the first soft symbol y1, and a fourth range, a fifth range, and a sixth range along the vertical axis for values of the second soft symbol y2. None of the ranges have a trivial range of zero. The first range covers values below the first threshold level s1, the second range covers values from the first threshold level s1 to the second threshold level s2, and the third range covers values above the second threshold level s2. The first range and the third range are not unbounded; the first range is bounded at least by 0 due to the operation of the magnitude squarer 208, and the third range is bounded at its upper end by at least the maximum value given the number of bits of resolution used for the soft symbols. For example, for an 8-bit binary word, the maximum value is 255, and for a 16-bit binary word, the maximum value is 65,535. Other values can be used for bounds.

Similarly, the fourth range covers values below the first threshold level s1, the fifth range covers values from the first threshold level s1 to the second threshold level s2, and the sixth range covers values above the second threshold level s2. The fourth range and the sixth range are not unbounded; the fourth range is bounded at least by 0 due to the operation of the magnitude squarer 208, and the sixth range is bounded at its upper end by at least the maximum value given the number of bits of resolution used for the soft symbols.

In one implementation, the first range and the fourth range are identical, the second range and the fifth range are identical, and the third range and the sixth range are identical, but in alternative implementations, the ranges can be different with different values for the thresholds s1, s2.

In one implementation, the collision detector 200 determines if the value of the first soft symbol y1 is in the first range, the second range, or the third range, and if the value of the second soft symbol y2 is in the fourth range, the fifth range, or the sixth range. The collision detector 200 determines that a collision occurs when (a) the value of the first soft symbol (y1) is within the second range; (b) the value of the second soft symbol (y2) is within the fourth range; or (c) the value of the first soft symbol (y1) is within the third range, and the value of the second soft symbol (y2) is within the sixth range. Otherwise, the collision detector 200 determines that no collision is occurring.

In an alternative implementation, the collision detector 200 determines if the value of the first soft symbol y1 is in the first range, the second range, or the third range, and if the value of the second soft symbol y2 is in the fourth range, the fifth range, or the sixth range. The collision detector 200 determines that no collision is occurring when: (a) the value of the first soft symbol (y1) is within the first range, and the value of the second soft symbol (y2) is within the fourth range; (b) the value of the first soft symbol (y1) is within the third range, and the value of the second soft symbol (y2) is within the fourth range; or (c) the value of the first soft symbol (y1) is within the first range, and the value of the second soft symbol (y2) is within the sixth range. Otherwise, the collision detector 200 determines that a collision is occurring.

Figure 8:
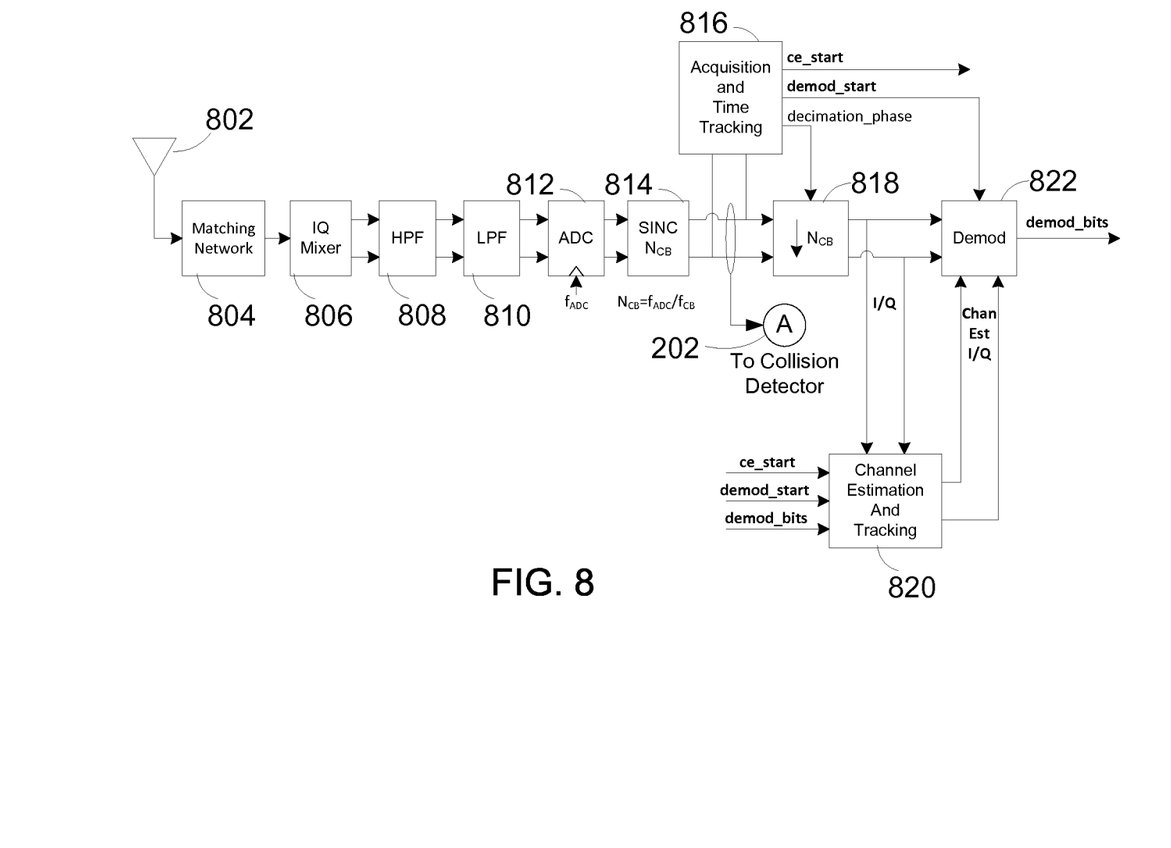
FIG. 8 illustrates an implementation of a receiver in which the collision detector can be implemented.

FIG. 8 illustrates an implementation of a receiver for the initiator 102 (FIG. 1) in which the collision detector 200 can be implemented. The receiver can include an antenna 802, a matching network 804, a quadrature amplitude modulation (I-Q) mixer 806, a high pass filter 808, a low pass filter 810, an analog-to-digital converter 812, a Sinc filter 814, an acquisition and time tracking block 816, a downsampler 818, a channel estimation and tracking block 820, and a demodulator 822. In one implementation, the input baseband signal "A" 202 (FIG. 2) of the collision detector 200 is provided by an output of the Sinc filter 814.

In the illustrated implementation, the antenna or coil 802 is coupled to an input of a matching network 804. An output of the matching network 804 is coupled to an input of a quadrature amplitude modulation mixer 806. Outputs of the quadrature amplitude modulation mixer 806 are coupled to inputs of a high pass filter 808. Outputs of the high pass filter 808 are coupled to inputs of a low pass filter 810. Outputs of the analog-to-digital converter 812 are coupled to inputs of the Sinc filter 814.

The outputs of the Sinc filter 814 are coupled to inputs of the collision detector 200 (FIG. 2), inputs of the acquisition and time tracking block 816, and to inputs of the downsampler 818. The outputs of the downsampler 818 are coupled to inputs of the channel estimation and tracking block 820 and to inputs of the demodulator 822.

The antenna or coil 802 receives the RF signal. The matching network 804 provides an impedance match between the antenna 802 and the quadrature amplitude modulation mixer 806. The quadrature amplitude modulation mixer 806 multiplies the RF signal with a local oscillator signal and a phase-shifted local oscillator signal to separate in-phase (I) and quadrature phase (Q) components of the modulation on the RF signal. For example one output of the quadrature amplitude modulation mixer 806 can be the in-phase (I) signal, and the other output of the quadrature amplitude modulation mixer 806 can be the quadrature phase (Q) signal. In one implementation, the quadrature amplitude modulation mixer 806 can also perform downconversion.

The high pass filter 808 provides anti-aliasing filtering for the I and Q signals, as these signals are to be converted to digital form later by the analog-to-digital converter 812. The low-pass filter 810 removes DC offsets from the I and Q signals. The order of the high pass filter 808 and the low pass filter 810 can be interchanged. In an alternative implementation, the high pass filter 808 and the low pass filter 810 can be replaced by a band-pass filter.

The analog-to-digital converter 812 converts the I and Q signals from analog form to digital form. The Sinc filter 814 receives the digital I and Q signals from the analog-to-digital converter 812 and performs bandpass filtering on the digital I and Q signals. Other types of bandpass filters can be used for the Sinc filter 814.

The acquisition and time tracking block 816 performs time alignment for acquisition of the I and Q signals. The timing of the start of the replica code is adjusted by the acquisition and time tracking block 816 until the output becomes correlated at which point the signal is "acquired."

The downsampler 818 can decimate or remove the samples. For example, the ADC 812 can provide relatively many samples for relatively good acquisition. However, fewer than all the samples may be used to maintain acquisition. Processing fewer samples can save power. In one non-limiting example, the downsampler 818 can decimate or remove samples, such as can remove several samples for each one to be processed later. After the signal is acquired, the acquisition and time tracking block 816 can be shut down to save power.

The channel estimation and tracking block 820 maintains acquisition on the decimated I and Q signals. The demodulator 822 demodulates the decimated samples. For example, the I and Q signals can be demodulated by mapping constellation points from an I and Q space to output codes, such as a demodulation according to 16-QAM.

Figure 9:
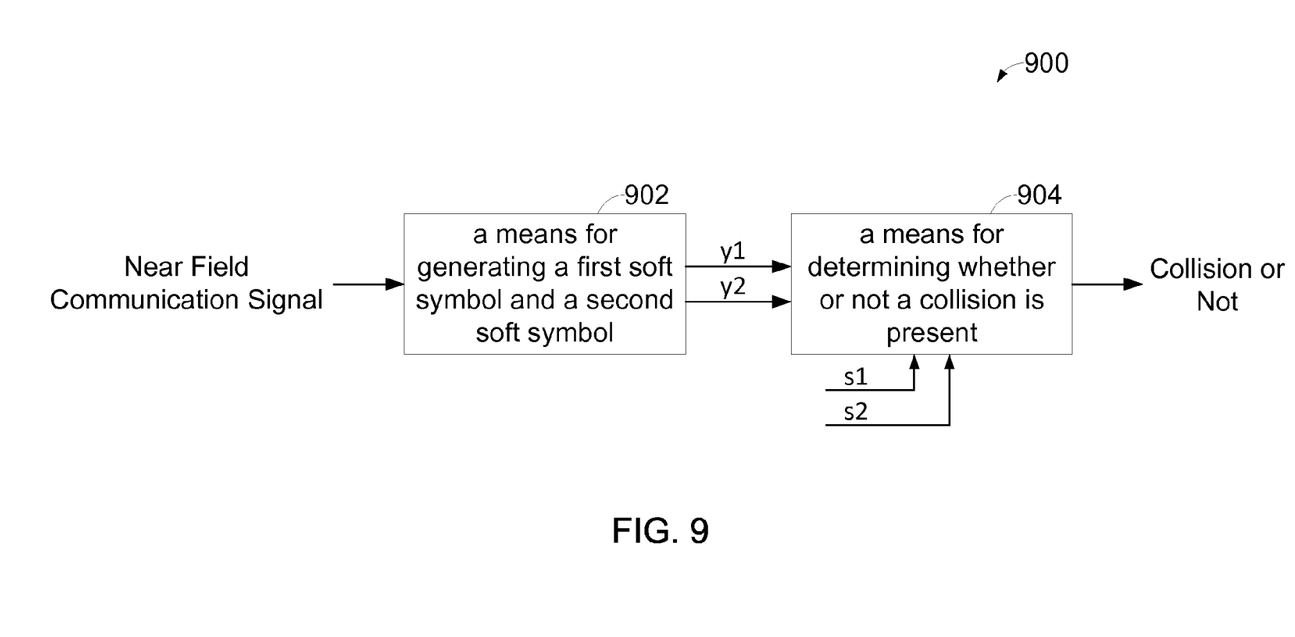
FIG. 9 illustrates another block diagram of a collision detector.

FIG. 9 illustrates an alternative embodiment of a collision detector 900 for a near field communication system. The collision detector 900 includes a means for generating a first soft symbol 902 and a means for determining whether or not a collision is present 904. The means for generating a first soft symbol 902 is connected to the means for determining whether or not a collision is present 904.

The means for generating a first soft symbol and a second soft symbol 902 is configured to generate the first soft symbol y1 and the second soft symbol y2 such that values of the first soft symbol y1 and the second soft symbol y2 are at least indicative of a presence of load modulation in a first portion and a second portion, respectively, of a data symbol period of a near field communication signal. The means for determining whether or not a collision is present 904 is configured to determine whether or not a collision is present based at least partly on comparisons of the values of the first soft symbol y1 and the second soft symbol y2 with at least two different threshold levels s1, s2.

Herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

Herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus, comprising:
   a circuit configured to generate a first soft symbol and a second soft symbol, wherein values of the first soft symbol and the second soft symbol are at least indicative of a presence or absence of load modulation in a first portion and a second portion of a data symbol period of a near field communication signal; and
   a collision analyzer configured to determine whether or not a collision is present based at least partly on comparisons of the values of the first soft symbol and the second soft symbol with at least two different threshold levels.

2. The apparatus of claim 1, wherein the collision analyzer is further configured to:
   compare the first soft symbol to a first threshold level and to a second threshold level; and
   compare the second soft symbol to the first threshold level and to a second threshold level.

3. The apparatus of claim 1, wherein the collision analyzer is further configured to:
   determine that no collision is present when any of states (a), (b), or (c) is true, wherein:
      state (a) corresponds to the first soft symbol and the second soft symbol both having values below that of a first threshold level;
      state (b) corresponds to the first soft symbol having a value above that of a second threshold level, and the second soft symbol having a value below that of the first threshold level; and
      state (c) corresponds to the second soft symbol having a value above that of a second threshold level, and the first soft symbol having a value below that of the first threshold level; and
   determine that a collision is present when none of states (a), (b), or (c) is true.

4. The apparatus of claim 3, wherein the first threshold level and the second threshold level are configurable.

5. The apparatus of claim 1, wherein the collision analyzer is further configured to:
   determine if the value of the first soft symbol is in one of at least a first range, a second range, or a third range, wherein there is no overlap among the first range, the second range, and the third range, wherein the third range has higher values than the second range, and wherein the second range has higher values than the first range;
   determine if the value of the second soft symbol is in one of at least a fourth range, a fifth range, or a sixth range, wherein there is no overlap among the fourth range, the fifth range, and the sixth range, wherein the sixth range has higher values than the fifth range, and wherein the fifth range has higher values than the fourth range;
   determine that a collision occurs when:
      (a) the value of the first soft symbol is within the second range;
      (b) the value of the second soft symbol is within the fifth range; or
      (c) the value of the first soft symbol is within the third range, and the value of the second soft symbol is within the sixth range; and
   determine that no collision occurs when none of (a), (b), or (c) is true.

6. The apparatus of claim 5, wherein the first range and the fourth range are identical, wherein the second range and the fifth range are identical, and wherein the third range and the sixth range are identical.

7. The apparatus of claim 1, wherein the collision analyzer is further configured to:
   determine if the value of the first soft symbol is in one of at least a first range, a second range, or a third range, wherein there is no overlap among the first range, the second range, and the third range, wherein the third range has higher values than the second range, and wherein the second range has higher values than the first range;
   determine if the value of the second soft symbol is in one of at least a fourth range, a fifth range, or a sixth range, wherein there is no overlap among the fourth range, the fifth range, and the sixth range, wherein the sixth range has higher values than the fifth range, and wherein the fifth range has higher values than the fourth range;
   determine that no collision occurs when:
      (a) the value of the first soft symbol is within the first range, and the value of the second soft symbol is within the fourth range;
      (b) the value of the first soft symbol is within the third range, and the value of the second soft symbol is within the fourth range; or
      (c) the value of the first soft symbol is within the first range, and the value of the second soft symbol is within the sixth range; and
   determine that a collision occurs when none of (a), (b), or (c) is true.

8. The apparatus of claim 7, wherein the first range and the fourth range are identical, wherein the second range and the fifth range are identical, and wherein the third range and the sixth range are identical.

9. An electronically-implemented method of detecting data collisions for a near field communication system, the method comprising:

generating, by an electronic circuit, a first soft symbol and a second soft symbol, wherein values of the first soft symbol and the second soft symbol are at least indicative of a presence or absence of load modulation in a first portion and a second portion of a data symbol period of a near field communication signal; and determining whether or not a collision is present based at least partly on comparisons of the values of the first soft symbol and the second soft symbol with at least two different threshold levels.

10. The method of claim 9, wherein the comparisons further comprise:

comparing the first soft symbol to a first threshold level and to a second threshold level; and comparing the second soft symbol to the first threshold level and to a second threshold level.

11. The method of claim 9, wherein determining whether or not a collision is present further comprises:

determining that no collision is present when any of states (a), (b), or (c) is true, wherein:

state (a) corresponds to the first soft symbol and the second soft symbol both having values below that of a first threshold level;

state (b) corresponds to the first soft symbol having a value above that of a second threshold level, and the second soft symbol having a value below that of the first threshold level; and state (c) corresponds to the second soft symbol having a value above that of a second threshold level, and the first soft symbol having a value below that of the first threshold level; and determining that a collision is present when none of states (a), (b), or (c) is true.

12. The method of claim 11, further comprising receiving values for at least one of the first threshold level or the second threshold level.

13. The method of claim 9, further comprising:

determining if the value of the first soft symbol is in one of at least a first range, a second range, or a third range, wherein there is no overlap among the first range, the second range, and the third range, wherein the third range has higher values than the second range, and wherein the second range has higher values than the first range;

determining if the value of the second soft symbol is in one of at least a fourth range, a fifth range, or a sixth range, wherein there is no overlap among the fourth range, the fifth range, and the sixth range, wherein the sixth range has higher values than the fifth range, and wherein the fifth range has higher values than the fourth range;

determining that a collision occurs when:

(a) the value of the first soft symbol is within the second range;

(b) the value of the second soft symbol is within the fifth range; or (c) the value of the first soft symbol is within the third range, and the value of the second soft symbol is within the sixth range; and determining that no collision occurs when none of (a), (b), or (c) is true.

14. The method of claim 13, wherein the first range and the fourth range are identical, wherein the second range and the fifth range are identical, and wherein the third range and the sixth range are identical.

15. The method of claim 9, further comprising:

determining if the value of the first soft symbol is in one of at least a first range, a second range, or a third range, wherein there is no overlap among the first range, the second range, and the third range, wherein the third range has higher values than the second range, and wherein the second range has higher values than the first range;

determining if the value of the second soft symbol is in one of at least a fourth range, a fifth range, or a sixth range, wherein there is no overlap among the fourth range, the fifth range, and the sixth range, wherein the sixth range has higher values than the fifth range, and wherein the fifth range has higher values than the fourth range;

determining that no collision occurs when:

(a) the value of the first soft symbol is within the first range and the value of the second soft symbol is within the fourth range;

(b) the value of the first soft symbol is within the third range and the value of the second soft symbol is within the fourth range; or (c) the value of the first soft symbol is within the first range and the value of the second soft symbol is within the sixth range; and determining that a collision occurs when none of (a), (b), or (c) is true.

16. The method of claim 15, wherein the first range and the fourth range are identical, wherein the second range and the fifth range are identical, and wherein the third range and the sixth range are identical.

17. The method of claim 9, further comprising setting an interrupt upon a determination of a collision.

18. The method of claim 9, further comprising:

downconverting the near field communication signal to generate a downconverted signal;

converting the downconverted signal from analog to digital to generate a digital downconverted signal;

filtering the digital downconverted signal to generate a filtered digital downconverted signal;

despreading the filtered digital downconverted signal to generate a despreaded signal;

accumulating the despreaded signal at half data symbol intervals to generate accumulated values, wherein the accumulated values are complex; and generating a magnitude squared of the accumulated values to generate the first soft symbol and the second soft symbol, wherein one of the first soft symbol or the second soft symbol is delayed from the other by half a symbol period.

19. An apparatus for detecting data collisions for a near field communication system, the apparatus comprising:

a means for generating a first soft symbol and a second soft symbol, wherein values of the first soft symbol and the second soft symbol are at least indicative of a presence or absence of load modulation in a first portion and a second portion of a data symbol period of a near field communication signal; and a means for determining whether or not a collision is present based at least partly on comparisons of the values of the first soft symbol and the second soft symbol with at least two different threshold levels.

20. The apparatus of claim 19, wherein determining means is further configured to:

compare the first soft symbol to a first threshold level and to a second threshold level; and compare the second soft symbol to the first threshold level and to a second threshold level.

21. The apparatus of claim 19, wherein the determining means is further configured to:

determine that no collision is present when any of states (a), (b), or (c) is true, wherein:
  state (a) corresponds to the first soft symbol and the second soft symbol both having values below that of a first threshold level;
  state (b) corresponds to the first soft symbol having a value above that of a second threshold level, and the second soft symbol having a value below that of the first threshold level; and
  state (c) corresponds to the second soft symbol having a value above that of a second threshold level, and the first soft symbol having a value below that of the first threshold level; and
determine that a collision is present when none of states (a), (b), or (c) is true.

22. The apparatus of claim 21, further comprising a means for receiving values for at least one of the first threshold level or the second threshold level.

23. The apparatus of claim 19, further comprising:
  a means for determining if the value of the first soft symbol is in one of at least a first range, a second range, or a third range, wherein there is no overlap among the first range, the second range, and the third range, wherein the third range has higher values than the second range, and wherein the second range has higher values than the first range;
  a means for determining if the value of the second soft symbol is in one of at least a fourth range, a fifth range, or a sixth range, wherein there is no overlap among the fourth range, the fifth range, and the sixth range, wherein the sixth range has higher values than the fifth range, and wherein the fifth range has higher values than the fourth range;
  a means for determining that a collision occurs when:
    (a) the value of the first soft symbol is within the second range;
    (b) the value of the second soft symbol is within the fifth range; or
    (c) the value of the first soft symbol is within the third range, and the value of the second soft symbol is within the sixth range; and
  a means for determining that no collision occurs when none of (a), (b), or (c) is true.

24. The apparatus of claim 23, wherein the first range and the fourth range are identical, wherein the second range and the fifth range are identical, and wherein the third range and the sixth range are identical.

25. The apparatus of claim 19, further comprising:
  a means for determining if the value of the first soft symbol is in one of at least a first range, a second range, or a third range, wherein there is no overlap among the first range, the second range, and the third range, wherein the third range has higher values than the second range, and wherein the second range has higher values than the first range;
  a means for determining if the value of the second soft symbol is in one of at least a fourth range, a fifth range, or a sixth range, wherein there is no overlap among the fourth range, the fifth range, and the sixth range, wherein the sixth range has higher values than the fifth range, and wherein the fifth range has higher values than the fourth range;
  a means for determining that no collision occurs when:
    (a) the value of the first soft symbol is within the first range and the value of the second soft symbol is within the fourth range;
    (b) the value of the first soft symbol is within the third range and the value of the second soft symbol is within the fourth range; or
    (c) the value of the first soft symbol is within the first range and the value of the second soft symbol is within the sixth range; and
  a means for determining that a collision occurs when none of (a), (b), or (c) is true.

26. The apparatus of claim 25, wherein the first range and the fourth range are identical, wherein the second range and the fifth range are identical, and wherein the third range and the sixth range are identical.

27. The apparatus of claim 19, further comprising a means for setting an interrupt upon a determination of a collision.

28. An apparatus for detecting data collisions induced for a near field communication system, the apparatus comprising:
  a processor; and
  a computer program executable by the processor the computer program embodied in a tangible, non-transitory computer-readable medium, wherein the computer program embodies a method comprising:
    generating a first soft symbol and a second soft symbol, wherein values of the first soft symbol and the second soft symbol are at least indicative of a presence or absence of load modulation in a first portion and a second portion of a data symbol period of a near field communication signal; and
    determining whether or not a collision is present based at least partly on comparisons of the values of the first soft symbol and the second soft symbol with at least two different threshold levels.

* * * * *